Sept. 20, 1966     S. E. CARLTON     3,273,583
PRESSURE RELIEF VALVES
Filed July 25, 1963     2 Sheets-Sheet 1
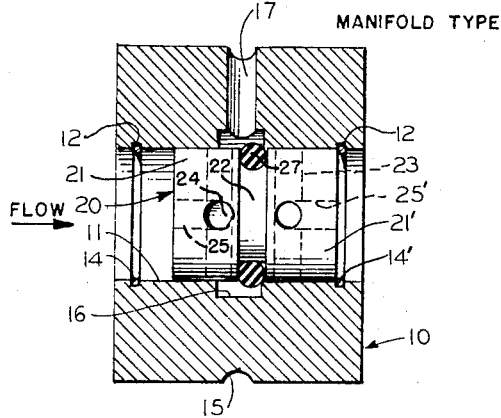
FIG_1 — MANIFOLD TYPE
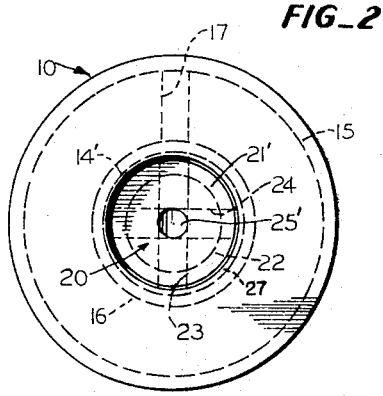
FIG_2
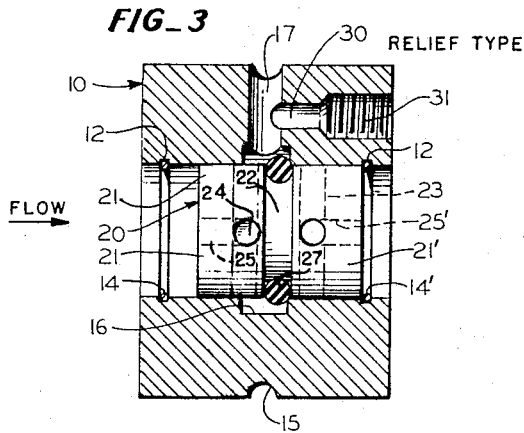
FIG_3 — RELIEF TYPE
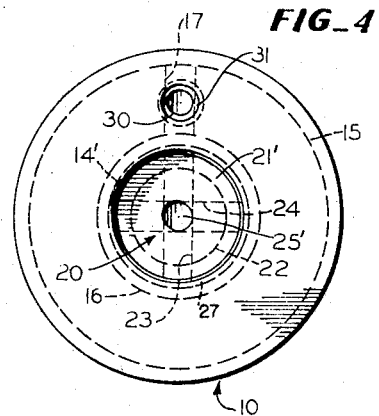
FIG_4
INVENTOR.
SYDNEY E. CARLTON
BY *Henry Gifford Hardy*
ATTORNEY

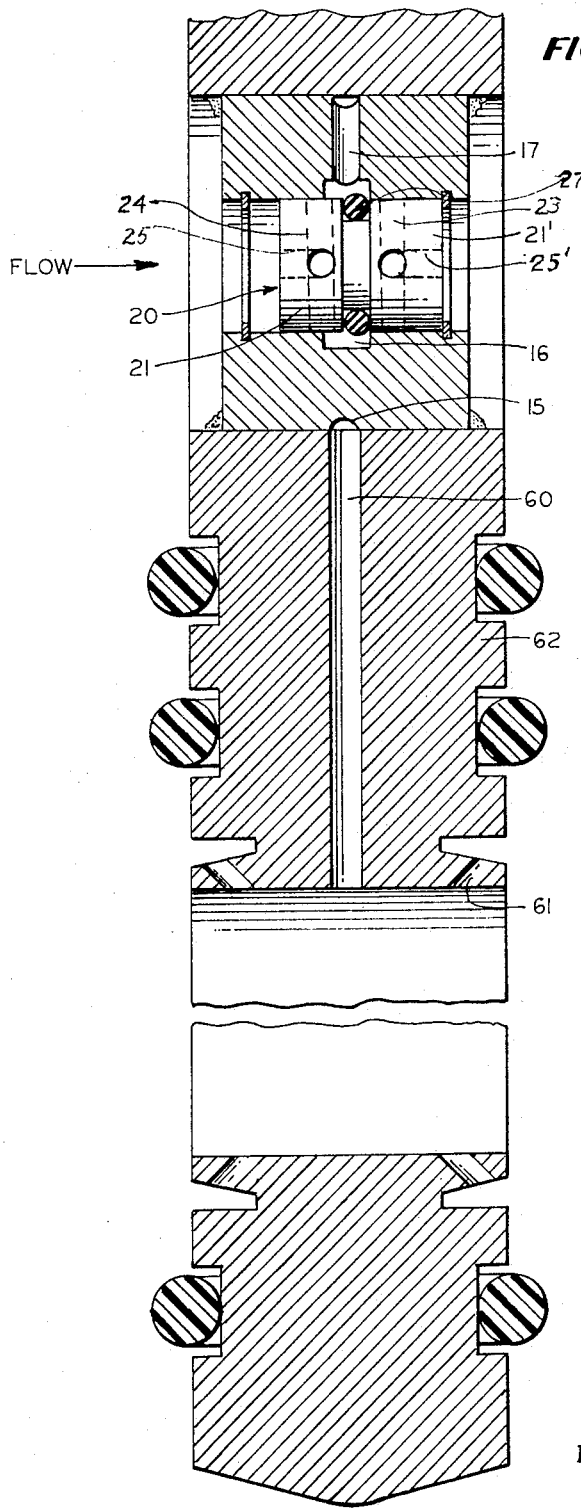

Patented Sept. 20, 1966

3,273,583
PRESSURE RELIEF VALVES
Sydney E. Carlton, 240 W. Hereford, Gladstone, Oreg.
Filed July 25, 1963, Ser. No. 297,507
4 Claims. (Cl. 137—112)

This invention relates to pressure relief valves and more particularly to such valves which are incorporated in and become a part of the valving mechanisms in pipelines. The invention applies equally to gate valves in pipelines used as transportation for gases and liquids, and for plant product use.

It is well known particularly in gas and oil transportation pipelines that the gate valves are subjected to substantial changes in temperature due to surrounding conditions. If the expansion and resulting pressure occurs in the line itself, unless the line is relieved it will blow up. Normally such ruptures will not occur in the valves themselves because the valves are stronger than the pipeline. However, when the gate valves are closed and there is a build up of expansion pressure within the valve cavity, the valve then becomes a pressure vessel and unless this pressure is relieved, it will damage the valve and blow out the gaskets and packings causing considerable damage and requiring the valve to be taken out of the line for repair and replacement.

Since all of the results of damage due to expansion pressure are extremely costly, not only in maintenance but in the terms of time and delay, the means for effective internal pressure relief have long been sought.

One of the objects of the present invention is to provide a relief valve which is manufactured as a part of a gate valve itself or as a separate assembly for insertion in existing gates and which will act to relieve any build up of pressure within the valve cavity back to the line itself.

It is also another object of the invention to provide a valve which will relieve against the build up of pressure by the continued running of a pump. Mechanical seals in pumps are expensive to replace and are subjected to damage from bottled up pressures unless suitable relief is provided. This is particularly true of dead-end lines and the like.

It is also an object of the present invention to provide a tank type internal relief valve in which excessive pressures actuate the valve and relieve the pressure back to the tank, but as soon as the pressure is relieved, a predetermined setting for a spring returns the relief valve to the closed position. In this manner the execessive pressure may be relieved without draining an entire line.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

In the drawings:

FIGURE 1 is a vertical section of the manifold type relief valve;

FIGURE 2 is a top plan view of the valve of FIGURE 1;

FIGURE 3 is a vertical section of the pump or bypass type of relief valve;

FIGURE 4 is a top plan view of the valve of FIGURE 3; and

FIGURE 5 is a fragmentary vertical section of a knife type gate with the valve of FIGURE 1 in position.

Referring now to the drawings in which like reference numerals refer to like parts throughout the several views, and with particular reference to FIGURES 1 and 2, which disclosed the manifold type of internal relief valve, it will be observed that the valve consists of a cylindrical body member 10 having an axial bore 11 extending therethrough. Adjacent each end of the through bore 11 are internal grooves 12 in which retainer snap rings 14 seat. About the midpoint of the cylindrical body member 10 is a circumferential groove 15 which lies substantially in the same transverse plane with a widened internal groove 16 extending radially outward from the through bore 11. A passage 17 is drilled so as to connect the groove 15 radially with the internal groove 16 and to provide communication therebetween. The radial passage 17 connects with a line 60 which is drilled from the edge 61 of the through opening in the gate valve 62 to communicate therewith and make it subject to the pressures within the gate valve cavity. The body of the relief valve is positioned in the face of the gate of the gate valve in the area which is exposed to the line pressure in the closed position (see FIGURE 5). In the manifold type relief valve shown in FIGURES 1 and 2, the valve must extend completely through the gate so that the piston heads 21 and 21' are exposed to the pressures on opposite sides of the closed gate.

Within the through bore 11 there is a movable piston 20 having matching ends or piston heads 21, and 21' separated by a groove 22 which is substantially transverse at its midpoint. The groove 22 is not as wide as the groove 16 in the valve body and seats the sealing O-ring 27. Through each of the heads 21 and 21' a pair of diametric passages 23 and 24 are drilled which intersect each other and the axial bore 25 or 25' at the center. For most purposes only one of these passages in each piston head as shown in FIGURE 1, is required in each piston head. From the outer surface of each of the heads 21 and 21' axial passages 25 and 25' are bored so that they intersect the passages 24 and 23 respectively and communicate therewith.

Thus, it will be observed when the valve is in the position shown in FIGURE 1 the piston floats on the line pressure so that pressure in the line in the direction of the flow arrow will cause the piston 20 to move to its maximum position against the snap ring 14' in the manner shown. It will be observed that the transverse port 23 of head 21' is closed off and port 24 of the head 21 is in communication with the cavity provided by the groove 16 which in turn is in communication with the line 17 to the valve cavity by passage 60 as before described. Thus, any expanded pressure in the valve cavity will be relieved through the communicating passage 60 in the gate 62 of the valve to the radial passage 17 of the relief valve, into the chamber formed by the groove 16, through the passages 24 and equalized into the pressure of the line where it is equalized and dissipated. Thus, at all times when the valve gate is closed, any build up of expansion pressures inside the valve cavity is relieved and equalized in this manner.

Since there is no relief to the opposite side at any one time, the valve is intended for use where multiple types of products are moved through a common manifold and operable in response to the flow pressure in either direction. Hence its name: manifold type relief valve.

As shown in the drawings, the relief valve is intended for use on a two-way valve because precisely the same operation takes place when the pressure is from the opposite side. If the valve is intended for service with the flow in one direction only, no passages are provided in the piston head 21 on the downstream side of the pressure.

With respect to the pump type of internal relief valve, a different problem is encountered since contamination of products is not a factor. This is best described by reference to FIGURES 3 and 4.

As shown in FIGURES 3 and 4, a longitudinal by-pass passage 30 is drilled and tapped on the annular face of the body portion which is shown as opposite to the pressure of the line of flow. This may be threaded as at 31, to insert a plug to convert the same to a manifold type valve, if desired. The passage 30 communicates either directly or by connection with a bore, with the downstream side of the gate where the pressure is relieved. In this instance, if a pump is pumping against a dead-end or a closed gate valve the flow pressure will force the piston 20 to the maximum position shown in FIGURE 3, where it is restrained by the snap ring 14'. In this instance the expanded pressure within the valve chamber is relieved by bore 60 through the line 17 into the passage 30 and out to the downstream or non-pressure side. There will be a small flow through the central passage 25 and the passage 24 in piston head 21 since they are in communication with the chamber of the groove 16 and the line 17. Obviously, such an arrangement would not be satisfactory where there are several types of products to be moved through the same manifold because of product contamination.

In FIGURE 5 the valve of FIGURE 1 is shown in position in the knife or gate of a gate valve. In the closed position the flow is indicated as against the piston 20 of the valve so that the passage 17 through the annular duct 15 communicates with the internal passage 60 of the gate 62. Thus, if there is any build up of pressure in the valve cavity (not shown) when the gate 62 is in the closed position, this pressure will be communicated through internal passage 60 through the annular channel 15 and passage 17 to the communicating ports 24 and 25 and thence equalized with the flow pressure on piston head 20. The short internal vents 61 communicating with the flow passage of the gate 62 assist in making sure that any pressures above the flow pressures are communicated and relieved as described above. It is apparent from FIGURE 5 that if the flow is in the opposite direction the same result is accomplished through ports 23' and 25'.

The use of these relief valves as component parts in the gates of the gate valves controlling a pipeline system increases the efficiency of the operating valve about thirty-five percent. This is in addition to the benefits resulting from the lack of damage to the valves themselves, the freedom of maintenance, the loss of time and products involved in the build up of any pressure within the valves because of expanded pressures. All of these relief valves have one thing in common, that all operate and function by means of a sliding piston to relieve expanded pressure which would otherwise damage and perhaps destroy the valve itself as well as other parts of the system, if left without relief.

I claim:
1. In a relief valve for mounting in the gate of a gate valve and operable in the closed position of said gate valve a body portion having a top and bottom, an axial bore extending through said body, an annular groove extending outwardly from said bore at substantially the plane of the mid-point, an inwardly directed groove on the exterior of said body member in the same plane as said annular groove, a transverse radial passage in said body connecting said grooves, a double headed piston mounted for axial slidable movement in said bore, said piston having an annular groove substantially at its mid-point said groove being substantially less in width than the annular groove of the bore dividing the piston into two, a transverse passage through each head adjacent the median groove and spaced from each other so that one of them is always in communication with the bore annular groove and said radial passage and an axial passage connecting the transverse passage with the exposed outer surfaces of each piston head.

2. The combination of claim 1 wherein the piston is removably retained within the bore adjacent each end so as to restrict its travel in either direction so that the transverse passage of one head is always in communication with the radial passage of the body member.

3. The combination of claim 1 wherein the transverse passage is connected to an end surface of the body portion by an axial offset passage communicating with the downstream side of the gate valve.

4. The combination of claim 1 wherein the transverse passage is connected to an end surface by an axial offset passage in said body portion which is internally threaded to receive a threaded plug.

References Cited by the Examiner

UNITED STATES PATENTS

| 730,085 | 6/1903 | Berg | 137—112 |
|---|---|---|---|
| 818,411 | 4/1906 | Bush | 137—538 |
| 1,967,383 | 7/1934 | Turgot | 137—119 X |
| 2,354,791 | 8/1944 | Boldt | 137—112 |
| 2,385,513 | 9/1945 | Helvern | 137—112 X |
| 2,651,491 | 9/1953 | Ashton et al. | 137—113 X |
| 2,670,752 | 3/1954 | Laurent | 137—119 |
| 2,982,260 | 5/1961 | Hunter | 137—112 X |
| 3,123,090 | 3/1964 | Bredtschneider | 137—112 |
| 3,130,742 | 4/1964 | Bredtschneider | 251—327 X |

FOREIGN PATENTS

| 445,506 | 2/1949 | Italy. |
|---|---|---|

WILLIAM F. O'DEA, *Primary Examiner.*

ISADOR WEIL, *Examiner.*

J. O'NEILL, D. ZOBIW, *Assistant Examiners.*